United States Patent
Barnes et al.

(10) Patent No.: US 12,037,484 B2
(45) Date of Patent: Jul. 16, 2024

(54) LATENT ELASTIC OLEFIN FILM LAMINATES AND METHODS OF MAKING ABSORBENT ARTICLES INCORPORATING THE SAME

(71) Applicant: Kimberly-Clark Worldwide, Inc., Neenah, WI (US)

(72) Inventors: Craig A. Barnes, Cumming, GA (US); Lavada C. Boggs, Alpharetta, GA (US); Isabelle R. Bouchard, Fletcher, NC (US); James R. Fitts, Jr., Gainesville, GA (US); Daniel W. Hesse, Marietta, GA (US); Shawn E. Jenkins, Suwanee, GA (US); Lauren E. Zimmerman, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 358 days.

(21) Appl. No.: 17/497,636

(22) Filed: Oct. 8, 2021

(65) Prior Publication Data

US 2022/0041853 A1   Feb. 10, 2022

Related U.S. Application Data

(62) Division of application No. 16/344,271, filed as application No. PCT/US2017/059056 on Oct. 30, 2017, now abandoned.

(60) Provisional application No. 62/415,186, filed on Oct. 31, 2016.

(51) Int. Cl.
*B32B 5/02* (2006.01)
*B29D 99/00* (2010.01)
(Continued)

(52) U.S. Cl.
CPC .......... *C08L 53/00* (2013.01); *B29D 99/0064* (2013.01); *B32B 5/02* (2013.01);
(Continued)

(58) Field of Classification Search
CPC .......... B32B 7/12; B32B 5/022; B32B 27/20; B32B 5/02; B32B 7/02; B32B 27/32;
(Continued)

(56) References Cited

U.S. PATENT DOCUMENTS 3,354,506 A   11/1967   Raley
3,650,649 A   3/1972   Schippers
(Continued)

FOREIGN PATENT DOCUMENTS

CN   1348026 A   5/2002
JP   2008539340 A   11/2008
(Continued)

*Primary Examiner* — Monica A Huson

(57) ABSTRACT

A latent elastic film laminate is provided including a film predominantly comprising olefin elastomers. The film is stretched and maintained in a stretched state in order to impart the desired level of latent elasticity such that the conditioned film laminate will shrink upon activation, such as by heating. The latent elastic film laminate can be advantageously used in the manufacture of various elasticated articles, including absorbent personal care articles, by activating the latent elasticity after attachment to the article and thereby shirring and elasticizing components to which the film laminate is attached.

6 Claims, 3 Drawing Sheets

(51) Int. Cl.

| | | |
|---|---|---|
| *B32B 7/02* | (2019.01) | |
| *B32B 7/12* | (2006.01) | |
| *B32B 27/12* | (2006.01) | |
| *B32B 27/20* | (2006.01) | |
| *B32B 27/32* | (2006.01) | |
| *C08J 5/12* | (2006.01) | |
| *C08J 5/18* | (2006.01) | |
| *C08L 53/00* | (2006.01) | |
| *B29C 48/00* | (2019.01) | |
| *B29C 48/08* | (2019.01) | |
| *B29K 23/00* | (2006.01) | |
| *B29K 105/00* | (2006.01) | |
| *B29K 509/02* | (2006.01) | |
| *B29L 31/48* | (2006.01) | |

(52) U.S. Cl.
CPC ............... *B32B 5/022* (2013.01); *B32B 7/02* (2013.01); *B32B 7/12* (2013.01); *B32B 27/12* (2013.01); *B32B 27/20* (2013.01); *B32B 27/32* (2013.01); *C08J 5/12* (2013.01); *C08J 5/18* (2013.01); *B29C 48/0018* (2019.02); *B29C 48/0021* (2019.02); *B29C 48/08* (2019.02); *B29K 2023/0608* (2013.01); *B29K 2023/12* (2013.01); *B29K 2105/0088* (2013.01); *B29K 2509/02* (2013.01); *B29K 2995/0012* (2013.01); *B29K 2995/004* (2013.01); *B29K 2995/0046* (2013.01); *B29K 2995/0063* (2013.01); *B29L 2031/4878* (2013.01); *B32B 2264/102* (2013.01); *B32B 2307/30* (2013.01); *B32B 2307/51* (2013.01); *B32B 2307/704* (2013.01); *B32B 2307/718* (2013.01); *B32B 2307/72* (2013.01); *B32B 2307/726* (2013.01); *B32B 2307/7265* (2013.01); *B32B 2555/02* (2013.01); *C08J 2353/00* (2013.01); *C08J 2423/12* (2013.01); *C08J 2453/00* (2013.01); *C08L 2203/16* (2013.01); *C08L 2205/025* (2013.01); *C08L 2205/03* (2013.01); *C08L 2205/12* (2013.01)

(58) Field of Classification Search
CPC .............. B32B 27/12; B32B 2307/726; B32B 2307/72; B32B 2264/102; B32B 2307/718; B32B 2555/02; B32B 2307/704; B32B 2307/51; B32B 2307/7265; B32B 2307/30; C08J 5/18; C08J 5/12; C08J 2353/00; C08J 2423/12; C08J 2453/00; B29D 99/0064; C08L 53/00; C08L 2205/12; C08L 2203/16; C08L 205/03; C08L 2205/025; B29K 2995/004; B29K 2995/0063; B29K 2023/12; B29K 2995/0012; B29K 2105/0088; B29K 2509/02; B29K 2995/0046; B29K 2023/0608; B29L 2031/4878; B29C 48/0018; B29C 48/0021; B29C 48/08

See application file for complete search history.

(56) References Cited

U.S. PATENT DOCUMENTS

| | | |
|---|---|---|
| 3,801,429 A | 4/1974 | Schrenk et al. |
| 4,041,203 A | 8/1977 | Brock et al. |
| 4,525,407 A | 6/1985 | Ness |
| 4,685,916 A | 8/1987 | Enloe |
| 4,720,415 A | 1/1988 | Vander Wielen et al. |
| 4,816,094 A | 3/1989 | Pomplun et al. |
| 4,857,067 A | 8/1989 | Wood et al. |
| 4,865,902 A | 9/1989 | Golike et al. |
| 4,981,747 A | 1/1991 | Morman |
| 5,196,247 A | 3/1993 | Wu et al. |
| 5,244,716 A | 9/1993 | Thornton et al. |
| 5,272,236 A | 12/1993 | Lai et al. |
| 5,278,272 A | 1/1994 | Lai et al. |
| 5,382,400 A | 1/1995 | Pike et al. |
| 5,385,775 A | 1/1995 | Wright |
| 5,413,811 A | 5/1995 | Fitting et al. |
| 5,415,640 A | 5/1995 | Kirby et al. |
| 5,472,775 A | 12/1995 | Obijeski et al. |
| 5,492,751 A | 2/1996 | Butt et al. |
| 5,527,300 A | 6/1996 | Sauer |
| 5,539,056 A | 7/1996 | Yang et al. |
| 5,549,943 A | 8/1996 | Vicik |
| 5,594,955 A | 1/1997 | Sommers |
| 5,620,779 A | 4/1997 | Levy et al. |
| 5,770,531 A | 6/1998 | Sudduth et al. |
| 5,789,065 A | 8/1998 | Haffner et al. |
| 5,807,368 A | 9/1998 | Helmer |
| 5,810,954 A | 9/1998 | Jacobs et al. |
| 5,882,769 A | 3/1999 | McCormack et al. |
| 5,994,615 A | 11/1999 | Dodge et al. |
| 6,075,179 A | 6/2000 | McCormack et al. |
| 6,111,163 A | 8/2000 | McCormack et al. |
| 6,197,404 B1 | 3/2001 | Varona |
| 6,224,977 B1 | 5/2001 | Kobylivker et al. |
| 6,336,922 B1 | 1/2002 | VanGompel et al. |
| 6,372,172 B1 | 4/2002 | Sudduth et al. |
| 6,383,960 B1 | 5/2002 | Everett et al. |
| 6,410,823 B1 | 6/2002 | Daley et al. |
| 6,799,331 B2 | 10/2004 | Griesbach, III et al. |
| 6,809,048 B1 | 10/2004 | Jacobs |
| 6,811,643 B2 | 11/2004 | McAmish et al. |
| 6,818,083 B2 | 11/2004 | McAmish et al. |
| 6,824,734 B2 | 11/2004 | Boggs et al. |
| 6,953,452 B2 | 10/2005 | Popp et al. |
| 7,018,369 B2 | 3/2006 | VanGompel et al. |
| 7,039,990 B2 | 5/2006 | Gorman et al. |
| 7,150,731 B2 | 12/2006 | Cazzato et al. |
| 7,179,952 B2 | 2/2007 | Vukos et al. |
| 7,320,948 B2 | 1/2008 | Morman et al. |
| 7,351,297 B2 | 4/2008 | Middlesworth et al. |
| 7,491,666 B2 | 2/2009 | Smith et al. |
| 7,510,758 B2 | 3/2009 | Thomas et al. |
| 7,582,178 B2 | 9/2009 | Hughes et al. |
| 7,582,716 B2 | 9/2009 | Liang et al. |
| 7,585,382 B2 | 9/2009 | Hughes et al. |
| 7,803,244 B2 | 9/2010 | Siqueira et al. |
| 7,955,457 B2 | 6/2011 | Middlesworth et al. |
| 8,603,281 B2 | 12/2013 | Welch et al. |
| 8,709,191 B2 | 4/2014 | Hughes et al. |
| 9,011,625 B2 | 4/2015 | Siqueira et al. |
| 2004/0005457 A1 | 1/2004 | DeLucia et al. |
| 2004/0166756 A1 | 8/2004 | Kurihara et al. |
| 2005/0097659 A1 | 5/2005 | Aroch et al. |
| 2005/0245162 A1 | 11/2005 | McCormack et al. |
| 2006/0151914 A1 | 7/2006 | Gerndt et al. |
| 2007/0237924 A1 | 10/2007 | Bruce et al. |
| 2008/0095978 A1* | 4/2008 | Siqueira ............... B32B 27/20 156/181 |
| 2008/0119102 A1* | 5/2008 | Hughes ................. B32B 27/32 156/60 |
| 2014/0121623 A1 | 5/2014 | Kirby et al. |
| 2015/0099086 A1 | 4/2015 | Kim et al. |

FOREIGN PATENT DOCUMENTS

| | | |
|---|---|---|
| KR | 20010034663 A | 4/2001 |
| WO | 9504182 A1 | 2/1995 |
| WO | 9932699 A1 | 7/1999 |
| WO | 14044235 A1 | 3/2014 |
| WO | 16080960 A1 | 5/2016 |

\* cited by examiner

LATENT ELASTIC OLEFIN FILM LAMINATES AND METHODS OF MAKING ABSORBENT ARTICLES INCORPORATING THE SAME

The present application is a divisional application of and claims priority to and benefit of U.S. patent application Ser. No. 16/344,271, filed on 23 Apr. 2019, which claims priority to and benefit of PCT/US2017/059056, filed on 30 Oct. 2017, which claims priority to and benefit of 62/415,186, filed on 31 Oct. 2016, the contents of which are all incorporated herein by reference.

Elastic materials are commonly incorporated into many articles worn on or about the body in order to improve their ability to better fit the contours of the body. Examples of such articles that commonly employ elastic materials include diapers, training pants, adult incontinence garments, personal protective garments, wrap bandages, and so forth. However, elastic materials often present an undesirable hand-feel and/or level of softness. Thus, it is common to employ elastic composite materials in personal care articles and garments in view of the potential for skin contact. The elastic composites material may, for example, be formed from an elastic film and one or more outer facing materials, such as a nonwoven fabric, that provide the desired hand-feel and softness. The nonwoven fabric may be joined to the elastic film while the film is in a stretched condition so that the nonwoven fabric can gather between the locations where it is bonded to the film when the film retracts. The resulting elastic composite material is thereafter stretchable to the extent that the nonwoven fabric gathered between the bonded locations; the unfolding and flattening out of the gathers allowing the elastic film and composite material to elongate. Examples of stretch bonded composite materials are disclosed, for example, in U.S. Pat. No. 4,720,415 to Vander Wielen et al. and U.S. Pat. No. 5,385,775 to Wright. Unfortunately, however, the stretchable nature of the composite materials often causes problems during the manufacturing process of the articles incorporating the same. For example, the force required to unwind the rolled composite materials may at least partially extend the elastic composite material while the elastic article is under tension. This partial extension of the stretchable composite material can make it difficult to properly measure and position the desired quantity of the elastic material in the final product. Further, manufacture of multi-layered articles may require that the extensibility be imparted to the article itself and the processes of Vander Wielen and Wright, by their nature, are not readily applied to manufacture of complex multi-component articles. In this regard, a substantial degree of latent elasticity would be desired.

Elastic composite materials having latent elasticity are known including for example those described in U.S. Pat. No. 7,585,382 Hughes et al. In this regard, Hughes utilizes a mixture of olefin and non-olefin elastomers in order to generate crystalline domains when stretched such that the subsequent application of heat causes the domains to return to their unoriented state and the stretched film to shrink. However, Hughes requires the use of relatively expensive polymeric components as well as additional blending and compounding steps.

As such, a need remains for improved latent elastic composite materials and methods of making the same that are formed predominantly from olefin polymers that have a strong retractive force when heat activated and substantially less elasticity prior to re-activation and placement into a final product.

SUMMARY OF INVENTION

The present invention provides a heat shrinkable composite material comprising an elastic film the polymeric portion of which at least 90% semi-crystalline polyolefin polymer and a support layer intermittently bonded to the elastic film and wherein the composite material has a heat shrinkage greater than about 15% at 72° C. In certain embodiments the polymeric portion of the elastic film can comprise substantially entirely olefin polymers and in further aspects substantially entirely semi-crystalline polyolefin polymers such as those having densities between about 0.85 and 0.90 g/cm$^3$. Further, in certain embodiments the elastic film can comprise ethylene polymers, propylene polymers and blends thereof. Still further, in certain embodiments the support layer may comprise a fabric such as, for example, a nonwoven fabric having a basis weight less than about 20 g/M$^2$ and a tensile strength greater than about 50 g-f.

Also provided are methods of making elastic articles which includes the steps of: (i) melt extruding an extrudate having a polymeric portion comprising at least 90% semi-crystalline olefin polymer; (ii) chilling the extrudate to form an film having a temperature between about 10° C. and about 50° C.; (iii) then stretching the film between 2 times and 7 times its original length; (iv) bonding a support layer to the stretched film at intermittent locations to form a composite material; (v) winding the composite material onto a winder roll under tension such that the composite retracts less than about 80% of its length (relative that the length at bonding); (vi) aging the tensioned composite material on said roll for at least 24 hours and thereby forming a heat shrinkable composite; (vii) attaching the heat shrinkable composite material to a single component of an article at two locations distal to one another or to at least two components of an article distal to one another; (viii) applying heat to the heat shrinkable composite material wherein the composite material shrinks and acts to pull inwardly between the points of attachment and cause the points of attachment to move closer to one another thereby creating an elasticized region within the article. In certain embodiments, the method may be employed to form an elasticated component of a diaper or other garment such as to form an elasticated waistband, side panel, back panel, front panel and/or cuff.

DETAILED DESCRIPTION

Definitions

Figure 1:
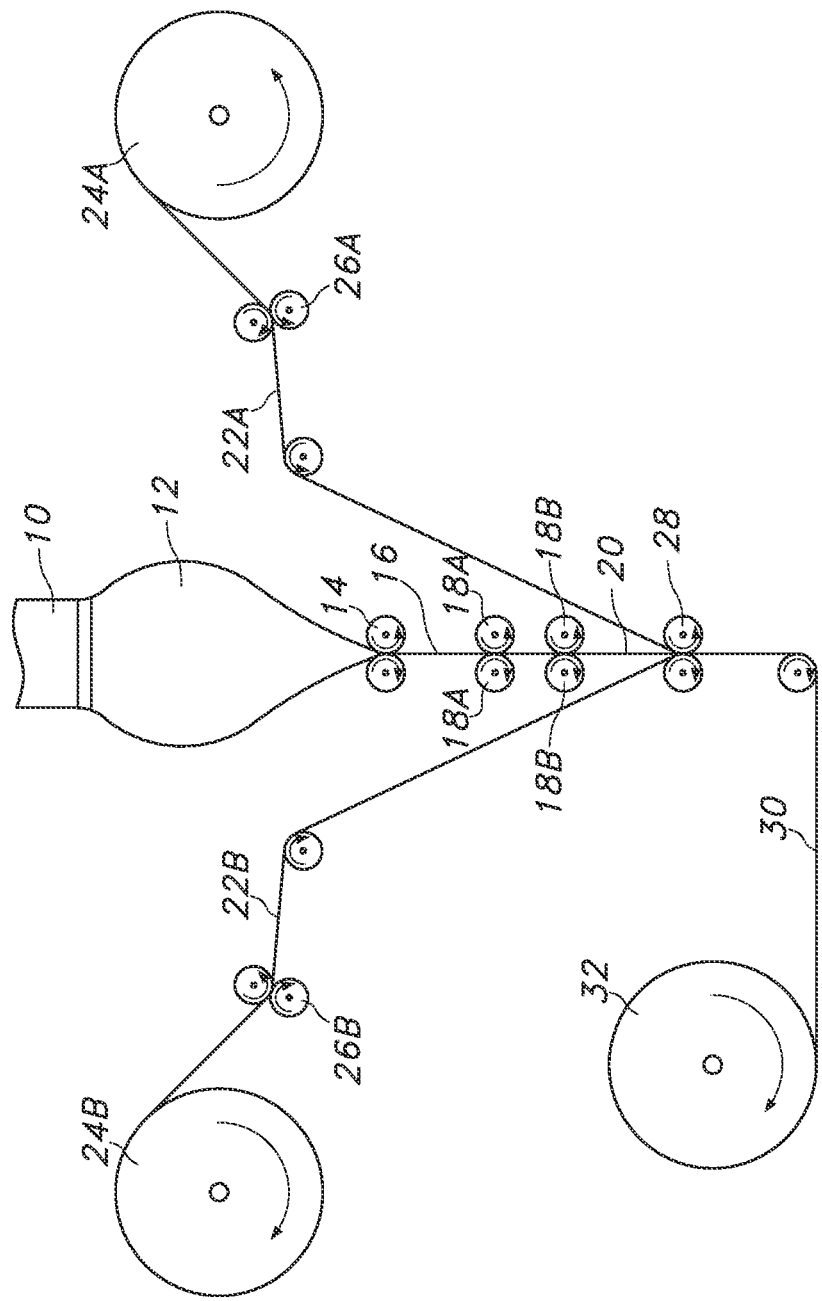
FIG. 1 is a schematic illustration of a method for forming a composite material according to one embodiment of the present invention.

Throughout the specification and claims, discussion of the articles and/or individual components thereof is with the understanding set forth below.

The term "comprising" or "including" or "having" are inclusive or open-ended and do not exclude additional unrecited elements, compositional components, or method steps. Accordingly, the terms "comprising" or "including" or "having" encompass the more restrictive terms "consisting essentially of" and "consisting of."

As used herein, the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein "propylene polymer" means a polymer having greater than 50% propylene content (mole percent).

As used herein "ethylene polymer" means a polymer having greater than 50% ethylene content (mole percent).

As used herein "olefin polymer" means a polymer having greater than 50% olefin content (mole percent).

As used herein, the term "nonwoven web" means a structure or a web of material that has been formed without use of traditional fabric forming processes such as weaving or knitting, to produce a structure of individual fibers or threads that are entangled or intermeshed, but not in an identifiable, repeating manner.

As used herein, the term "fabric" means a cohesive fibrous sheet-like material including woven, knitted, and nonwoven materials.

As used herein, the term "machine direction" or "MD" refers to the direction of travel of the film.

As used herein, the term "cross-machine direction" or "CD" refers to the direction which is essentially perpendicular to the machine direction defined above.

As used herein, the term "elastomeric" and "elastic" refers to a material that, upon application of a stretching force, is stretchable in at least one direction (such as the MD direction), and which upon release of the stretching force, contracts and returns to approximately its original dimension. For example, a stretched material may have a stretched length that is at least 50 percent greater than its relaxed unstretched length, and which will recover to within at least 50 percent of its stretched length upon release of the stretching force. A hypothetical example would be a one (1) inch sample of a material that is stretchable to at least 1.50 inches and which, upon release of the stretching force, will recover to a length of not more than 1.25 inches. Desirably, the material contracts or recovers at least 50 percent, and even more desirably, at least 80 percent of the stretched length.

As used herein, the term "percent stretch" refers to the degree to which a material stretches in a given direction when subjected to a certain force.

The film extrudate and corresponding elastic film of the present invention include a polymeric portion and in one aspect the polymeric portion of the film comprises greater than 90%, 92%, 95%, or 98% semi-crystalline polyolefin polymer(s). Exemplary semi-crystalline polyolefins include polyethylene, polypropylene, blends and copolymers thereof. In certain embodiments, the polymeric portion of the film extrudate and/or elastic film can comprise all or substantially all olefin polymers and, in a further aspect, all or substantially all semi-crystalline polyolefin polymer(s). In certain embodiments the film extrudate and corresponding elastic film can comprise a mixture of semi-crystalline olefin polymers such as a mixture of semi-crystalline ethylene and propylene polymers. For example, in certain embodiments the semi-crystalline polymer can comprise a mixture including greater than about 60% ethylene polymer and less than about 40% propylene polymer such as for example where the ethylene polymer comprises between about 80 and about 99% or between about 85 and about 95% of the semi-crystalline polymer and the propylene polymer comprises between about 1 and about 20% or between about 5 and about 15% of the semi-crystalline polymer. In alternate embodiments, the semi-crystalline polymer may comprise a mixture including greater than about 60% propylene polymer and less than about 40% ethylene polymer such as for example wherein the propylene polymer comprises between about 80 and about 99% or between about 85 and about 95% of the semi-crystalline polymer and the ethylene polymer comprises between about 1 and about 20% or between about 5 and about 15% of the semi-crystalline polymer.

Semi-crystalline polyolefins have or are capable of exhibiting a substantially regular structure. For example, semi-crystalline polyolefins may be substantially amorphous in their undeformed state, but form crystalline domains and/or increased polymer chain alignment upon stretching. The degree of crystallinity of the olefin polymer may be from about 3 percent to about 30 percent, in some embodiments from about 5 percent to about 25 percent, and in some embodiments, from about 5 percent and about 15 percent. Likewise, the semi-crystalline polyolefin may have a latent heat of fusion ($\Delta H_f$), which is another indicator of the degree of crystallinity, of from about 15 to about 75 Joules per gram ("J/g"), in some embodiments from about 20 to about 65 J/g, and in some embodiments, from 25 to about 50 J/g. The semi-crystalline polyolefin may also have a Vicat softening temperature of from about 10° C. to about 100° C., in some embodiments from about 20° C. to about 80° C., and in some embodiments, from about 30° C. to about 60° C. The semi-crystalline polyolefin may have a melting temperature of from about 20° C. to about 120° C., in some embodiments from about 35° C. to about 90° C., and in some embodiments, from about 40° C. to about 80° C. The latent heat of fusion ($\Delta H_f$) and melting temperature may be determined using differential scanning calorimetry ("DSC") in accordance with ASTM D3417-99 as is well known to those skilled in the art. The Vicat softening temperature may be determined in accordance with ASTM D1525-09. As is well known in the art, the percent of crystallinity can be calculated using heat of fusion obtained from DSC as mentioned above. The percent crystallinity is calculated by dividing the measured $\Delta H_f$ of the sample by the $\Delta H_f$ of a 100% crystalline polymer and then multiplying this quantity by 100. The $\Delta H_f$ for a 100% crystalline propylene polymer is assumed to be 189 J/g and the $\Delta H_f$ for a 100% crystalline ethylene polymer is assumed to be 292 J/g.

Particularly suitable polyethylene copolymers are those that are "linear" or "substantially linear." The term "substantially linear" means that, in addition to the short chain branches attributable to comonomer incorporation, the ethylene polymer also contains long chain branches in the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some embodiments, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

In one particular embodiment, an ethylene polymer is employed that is a copolymer of ethylene and an alpha-olefin, such as a $C_3$-$C_{20}$ alpha-olefin or $C_3$-$C_{12}$ alpha-olefin. Suitable alpha-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired alpha-olefin comonomers are 1-butene, 1-hexene and 1-octene. The ethylene or propylene content of such copolymers may be from about 60 mole percent to about 99 mole percent, in some embodiments from about 80 mole percent to about 98.5 mole percent, and in some embodiments, from about 87 mole percent to about 97.5 mole percent. The alpha-olefin content may likewise range from about 1 mole percent to about 40 mole percent, in some embodiments from about 1.5 mole percent to about 15 mole percent, and in some embodiments, from about 2.5 mole percent to about 13 mole percent. Ethylene polymer elastomers can have a density of from about 0.85 g/cm$^3$ to about 0.90 g/cm$^3$, and in certain embodiments between about 0.85 g/cm$^3$ to about 0.89 g/cm$^3$ or between about 0.86 to about 0.89 g/cm$^3$. Densities may be measured in accordance with ASTM 1505-10 at room temperature.

Suitable propylene polymers may include, for instance, copolymers or terpolymers of propylene, copolymers of propylene with an alpha-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 weight percent or less, in some embodiments from about 1 weight percent to about 20 weight percent, and in some embodiments, from about 2 weight percent to about 10 weight percent. Preferably, the density of the polypropylene (e.g., propylene/alpha-olefin copolymer) may be 0.91 g/cm$^3$ or less, and in certain embodiments may be between about 0.85 g/cm$^3$ and about 0.90 g/cm$^3$, between about 0.85 g/cm$^3$ and about 0.89 g/cm$^3$, between about 0.85 g/cm$^3$ and about 0.88 g/cm$^3$, and even between about 0.85 g/cm$^3$ to about 0.87 g/cm$^3$.

Exemplary commercially available polyolefin-based thermoplastic elastomers for use in the elastomeric film include VISTAMAXX™ (propylene-based elastomer, available from ExxonMobil Chemical, Houston, Tex.), INFUSE™ (olefin block copolymers, available from Dow Chemical Company, Midland, Mich.), VERSIFY™ (propylene-ethylene copolymers) such as VERSIFY™ 4200 and VERSIFY™ 4300 (Dow Chemical Company, Midland, Mich.), ENGAGE™ (ethylene octane copolymer, available from Dow Chemical, Houston, Tex.), and NOTIO 0040 and NOTIO 3560 (available from Mitsui Chemical (USA), New York, N.Y. In one particularly suitable embodiment, the polyolefin-based thermoplastic elastomer is VISTAMAXX™ 6102FL.

Any of a variety of known techniques may generally be employed to form the semi-crystalline polyolefins. For instance, olefin polymers may be formed using a free radical or a coordination catalyst (e.g., Ziegler-Natta). In certain embodiments, the olefin polymer may be formed from a single-site coordination catalyst, such as a metallocene catalyst. Such a catalyst system produces ethylene copolymers in which the comonomer is randomly distributed within a molecular chain and uniformly distributed across the different molecular weight fractions. Olefin elastomers and methods of making the same include, but are not limited to, those described in U.S. Pat. No. 5,272,236 to Lai et al., U.S. Pat. No. 5,278,272 to Lai et al., U.S. Pat. No. 5,472,775 to Obijeski et al., U.S. Pat. No. 5,539,056 to Yang et al. and U.S. Pat. No. 7,582,716 to Liang et al., the contents of which are incorporated herein in by reference to the extent consistent herewith.

The film may also include additional components as desired to achieve or enhance various properties. For example, in addition to the semi-crystalline polyolefin polymer, the film may optionally also include fillers, colorants, plasticizers, tackifiers, antioxidants, and/or other know additives. In certain embodiments, the film may include opacifying fillers or colorants, such as for example $TiO_2$, in an amount between about at 0.1 to about 5% by weight or between about 0.5 or to about 3% by weight of the film extrudate and elastic film. In still further embodiments, heat and/or UV stabilizer packages may be used, for example Eastman Regalrez 1049 or 1126, in amounts between about 2-10 wt. % or between about 3-8% by wt. of the film extrudate or elastic film. In a further aspect, a tackifier can be included in amounts under 10% by wt., such as for example one comprising oligomers and/or polymers of short-chain olefins such as short chain ($\leq C_{20}$) amorphous polyalphaolefins (APAOs).

Methods of Making the Latent Elastic Films

Numerous different known techniques may be used to form a film from the extrudate, including blowing, casting, flat die extruding, etc. Once chilled, the latent character of the film may be introduced through stretch-orientation. Although not required, the film may be stretched in-line without having to remove the film for separate processing. For example, the film may be immediately drawn by rolls rotating at different speeds of rotation so that the sheet is stretched to the desired draw ratio in the longitudinal direction (machine direction). This "uniaxially" stretched film may then be laminated to a fibrous web. In addition, the uniaxially stretched film may also be oriented in the cross-machine direction to form a "biaxially" stretched film. For example, the film may be clamped at its lateral edges by chain clips and conveyed into a tenter frame. In the tenter frame, the film may be drawn in the cross-machine direction to the desired draw ratio by chain clips diverging in their forward travel.

To achieve the desired latent elasticity of the film, various parameters of the stretching operation is selectively controlled, including the draw ratio, stretching temperature, time maintained in stretched condition, and so forth. The draw ratio may be determined by dividing the linear speed of the film exiting the stretching operation by the linear speed of the film entering the stretching operation. In some embodiments, for example, the film is stretched in the machine direction at a draw ratio of from about 2 to about 7, in some embodiments from about 3 to about 6, and in some embodiments, from about 4 to about 6. The orientation temperature profile is chosen to deliver the desired shrink mechanical properties, such as shrink tension and shrink percentage. More specifically, the orientation temperature is less than the melting temperature of the semi-crystalline polyolefin. For example, the chill rolls and travel distance of the film extrudate may be selected in order to obtain a film at stretching having sufficient crystallization in order to withstand the high tensions and stress associated with the stretching operations. In certain embodiments the temperature of the film extrudate may, at the onset of stretching, have an external temperature of from about 12° C. to about 60° C., and in other embodiments between about 12° C. to about 50° C. or between about 18° C. to about 43° C. In particular, when utilizing propylene polymers, it will often be desirable to conduct the film stretching operation at the lower end of the range. Preferably, the film is "cold drawn", i.e., stretched at ambient temperature without the application of external heat (e.g., heated rollers), to improve latent elasticity.

In addition, in order to achieve the desired latency and high retractive force, the film can be stretched and maintained in a stretched condition for a period of time beyond that required to achieve elasticity. This can be achieved in any one of numerous ways including for example, employing an extended stretching system in order to maintain the stretched, tensioned state for the required duration. Alternatively, the stretched-film can be wound onto a roll in a tensioned state, wherein the tension on the film as wound on the roll can be substantially the same as or a selected degree less than that applied for the stretch-thinning step.

In one embodiment and in reference to FIG. 1, the polymer extrudate is fed from a hopper (not shown), melted and directed to an extrusion apparatus 10 such as a film die. The extruded film 12 is then initially stretched and thinned such as by a conventional blown film process, cast film process or other film forming process as desired. With respect to blown films, air is used to expand a bubble of the extrudate through an annular die. The bubble is then collapsed and collected in flat film form. Processes for producing blown films are described, for instance, in U.S. Pat. No. 3,354,506 to Raley; U.S. Pat. No. 3,650,649 to Schippers; U.S. Pat. No. 3,801,429 to Schrenk et al., U.S. Pat. No. 6,824,734 to Boggs et al. and US2005/0245162 to McCormack et al. In the particular embodiment of FIG. 1, the blown film 12 is directed into nip rolls or "chill rolls" 14 to form a single-layered precursor elastic film 16. If a multilayer film is to be produced, the multiple layers are co-extruded together into the nip rolls. Typically, the nip rolls 14 are kept at temperature sufficient to solidify and quench the blown film 12 as it is formed, such as from about 20 to 60° C., thereby achieving a film temperature as noted above.

The elastic pre-cursor film 16 is then stretched-thinned in the machine direction by passing through a series of rolls 18 traveling at different circumferential speeds. In this regard, the first set of drive rollers 18A are travelling at a slower circumferential speed than the second set of drive rollers 18B located downstream from the first set of rollers 18A. While four rolls are illustrated as part of the drive rollers 18 in FIG. 1, it should be understood that the number of rolls may be higher as desired, depending on the level of stretch that is desired and the degrees of stretching between each roll. As is known in the art, the film may be stretched in either single or multiple discrete stretching operations. Alternatively, the elastic film may also be stretched using a conventional film-orientation unit or machine direction orienter ("MDO"), such as commercially available from Parkinson Technologies, Inc. As a result of the machine-direction orientation and stretching, an elastic film 20 is formed which is then directed to a further set of nip rolls 28.

At least one support member is employed as a facing material for laminating to the stretched elastic film. In this regard, the support member may comprise one or more fibrous materials or films having the desired physical attributes, such as pleasing hand, softness, aesthetics, tensile strength and/or other desired attributes. Importantly, the support member provides additional strength properties to the elastic film necessary for the associated processing, converting, and manufacturing of the ultimate article and/or for sufficient durability in use. In this regard, the support member provides additional tensile strength to the composite material and in this regard the support fabric has a tensile strength of at least about 50 g-f including for example having a tensile strength greater about 100 g-f, 150 g-f, 200 g-f, 250 g-f or even 300 g-f and, in certain embodiments, a tensile strength less than about 5000 g-f, 3000 g-f, 2500 g-f, 2000 g-f or even 1500 g-f. In addition, the support member desirably provides a pleasing hand. However, while added strength is needed, it is important not to substantially degrade the retractive force properties of the film and corresponding laminate. In this regard, the support member can be selected so as to be highly drapable and/or have a low bending modulus.

Fabrics suitable for use in the present invention as the support member include, but are not limited to, woven or knitted fabrics as well nonwoven fabrics such as those made by meltblowing, spunbonding, carding and/or hydroentangling processes. Examples of suitable fabrics and methods of making the same include, but are not limited to, those described in U.S. Pat. No. 5,492,751 to Butt et al., U.S. Pat. No. 6,224,977 Kobylivker et al., U.S. Pat. No. 8,603,281 to Welch et al., WO99/32699 to Stokes et al. and WO16/080960 to Kupelian et al.

Generally speaking, in order to limit the negative impact on the retractive force, lower basis weight support materials and fabrics will be utilized. In this regard, the fabrics desirably have a basis weight less than about 30 g/m$^2$. In certain embodiments, the support materials and fabrics can have a basis weight less than about 25 g/m$^2$, 20 g/m$^2$, 18 g/m$^2$ or even 16 g/m$^2$ and further, in certain embodiments, can have a basis weight in excess of about 5 g/m$^2$, 7 g/m$^2$ or even 8 g/m$^2$. Further, in order to achieve still greater drapability, the fabric is desirably treated in one or more additional respects such as by the use of internal softening agents, external softening agents and/or mechanical softening treatments.

By way of example, mechanical treatment of a web may be carried out by a number of different methods such as micro-creping, cold embossing, breaker bar treatment, neck-stretching, ring rolling, and combinations thereof. However, still other methods known in the art may also be used. With respect to stretching, it may be conducting either in the MD such as by using drive rollers or in the CD such as through use of a tenter frame. Grooved roll stretching may also be employed to stretch and soften fabrics. Examples of various methods of mechanically treating fabrics to impart improved drape and softness include, but are not limited to, those described in U.S. Pat. No. 5,413,811 Fitting et al., U.S. Pat. No. 5,770,531 to Sudduth et al., U.S. Pat. No. 5,810,954 Jacobs et al., U.S. Pat. No. 6,197,404 Varona, U.S. Pat. No. 6,372,172 Sudduth et al. and US2004005457 to DeLucia et al.

A support fabric that is sufficiently drapable and compliant may optionally include one or more internal softeners. The particular composition of the softening agent is not believed limited and may be anionic, nonionic or cationic. Examples of softeners include, but are not limited to, the following: olefin waxes such as a polyethylene wax; fatty acids such as erucic, oleic, stearic; fatty acid amides such as stearylamine or oleylamine; sulfated oils such as castor, olive and soybean; sulfated fatty alcohols or fatty acid esters; glycols and derivatives thereof such as glycerin, glyceryl monostearate, glycerol trioleate; polyglycol esters of fatty acids such as palmitic and stearic acids long chain amides; sugar alcohols and derivatives thereof such as sorbitol and sorbitan stearate; imidazolines; and so forth. Examples of additives for improving drape and softness of fabrics and films include, but are not limited to, those described in U.S. Pat. No. 5,770,531 to Sudduth et al., U.S. Pat. No. 6,197,404 Varona, US2004005457 DeLucia et al. and WO2014/044235 to Klaska et al.

Increased drape and softness of the nonwoven webs can be achieved by incorporating less than about 5 percent by weight of one or more softening agents in the final composition from which the fibers or films are extruded or otherwise formed. In further embodiments, the softening agent can be incorporated into the fibers and/or film in an amount less than about 5% by wt., 3% by wt. or even 1% by wt. and, in certain embodiments, in an amount greater than about 0.1%, 0.3% or even 0.5% by wt. As is well known in the art, the softening agent can be compounded with the fiber or film forming resin as a concentrate and then added and mixed with the uncompounded resin in order to achieve uniform distribution of the agent as part of a masterbatch process.

The support members or fabrics may be made in-line with the elastic film and/or provided from a supply roll. In reference to FIG. 1, a first nonwoven fabric 22A may be unwound from a first supply roll 24A and directed through a first set of drive rollers 26A. The nonwoven web 22A may then, together with the stretched film 20, be directed into the nip formed by bonding rolls 28. As the superposed materials travel through the bonding rolls 28 they are bonded to one another and form a cohesive, elastic laminate 30. Various techniques may be utilized to bond the elastic film 20 to the nonwoven fabric 22A including adhesive bonding, such as through gravure, slot or spray adhesive systems, and also mechanical bonding such as through thermal bonding, ultrasonic bonding and so forth.

However, so as not to unduly restrict the elasticity and/or shrinkage, the fabric is desirably bonded to the elastic film utilizing a pattern providing a bond area of less than about 35%, 30%, 25% or even 20% and, in certain embodiments, having a bond area of at least about 3%, 5%, 8% or even 10%. In addition, with respect to thermal bonding, in certain embodiments the fabric may be bonded to the elastic film at a temperature less than about 150° C. and greater than about 110° C. The bond pattern used may comprise a pattern of discrete, spaced apart bond points; such bond points may have various shapes including curvilinear shapes such as circles or ellipses, geometric shapes such as squares, rectangles or triangles, as well as icons such as a puppy, leaf or other recognizable objects. The individual bond points may be solid or hollow (i.e. having interior portions that are unbonded). Alternatively, the pattern may comprise a serious of continuous bond lines such as discretely spaced, non-intersecting lines including for example parallel and spaced lines having a crenulated, sinusoidal or other configuration. Still further, the bond pattern may be provided as part of an open lattice type pattern including a series of intersecting lines such as, for example, that of a honeycomb type pattern.

Optionally, the elastic film may also be bonded to a second fabric such that the elastic film is positioned between the two outer fabrics. In one embodiment, as shown in reference to FIG. 1, the elastic film 20 is simultaneously bonded on its other side to a second nonwoven fabric 22B originating from a second supply roll 24B and passing through second drive rollers 26B. The second fabric 22B may be the same as or different from that of the first fabric 22A. The nonwoven webs 22A and 22B may, together with the stretched film 20, be directed into the nip formed by bonding rolls 28 wherein the film is positioned between the outer nonwoven fabric layers 22A, 22B. As the superposed materials travel through the bonding rolls 28 they are bonded to one another thereby forming a cohesive, elastic laminate 30.

As a further option, the circumferential speed of the drive rollers 26 may be the same as or slower than that of the laminating rolls 28 and winder roll 32. In this regard, by employing a slower circumferential speed of the drive rollers 26 necking of the nonwoven fabrics 22A, 22B may be achieved as is known in the art to obtain improved drape and/or CD extensibility of the nonwoven fabric and composite material.

In the present embodiment as shown in reference to FIG. 1, the composite material 30 is wound on the winding roll 32 while under tension that is substantially the same as that applied to the elastic film 16, 20 upstream of the laminating rolls 28. The composite material 30 is kept fully under tension without retracting by using the same circumferential speed for the take-up roll 32 as that of the laminating rolls 28 and/or stretching rollers 18B. Alternatively, the elastic composite material may be allowed to slightly retract by applying a tension that is only slightly less than that applied upstream by the lamination rolls 28 and/or stretching rolls 18B. This may be achieved by using a slower circumferential speed for the roll 32 relative to that of the laminating rolls 28. In this regard, the elastic composite material may be allowed to retract no more than about 35%, 30%, 25%, 20% or even 15%. Because the film 20 of the composite material 30 is tensioned prior to lamination, upon relaxing it will retract toward its original pre-stretched machine direction length and become shorter in the machine direction, thereby buckling or forming gathers in the outer support layers of the composite material. The resulting elastic composite material thus becomes extensible in the machine direction to the extent that the gathers or buckles in the outer fabrics may be pulled back out flat and allow the elastic film to elongate.

The composite material, under tension on the roll, is maintained at ambient conditions for at least about 24 hours, 48 hours or even 72 hours in order to achieve further setting and/or crystallization of the stretched (tensioned) polymeric film. Subsequent heating of the composite material above the softening temperature of the semi-crystalline polymer(s) causes the highly oriented regions to return to an amorphous state and 'shrink' in the MD thereby resulting in the formation of gathers and an elastic composite material having significantly higher degree of elasticity.

The elastic composite materials formed according to the present invention exhibit a potential shrinkage having a high retractive force, capable of pulling the facing materials and other materials to which it is bonded as part of a personal care absorbent article. For example, the percent heat shrinkage at 72° C. of the composite material is desirably greater than about 15%, 20%, 25%, 30% or 35% (relative to the length prior to heat activation and shrinkage) and, in certain embodiments, can be less than about 55% or 50%. In addition, the activated (shrunk) elastic composite material will have a percent stretch of at least 50%, 60%, 70% or 80%.

Figure 2:
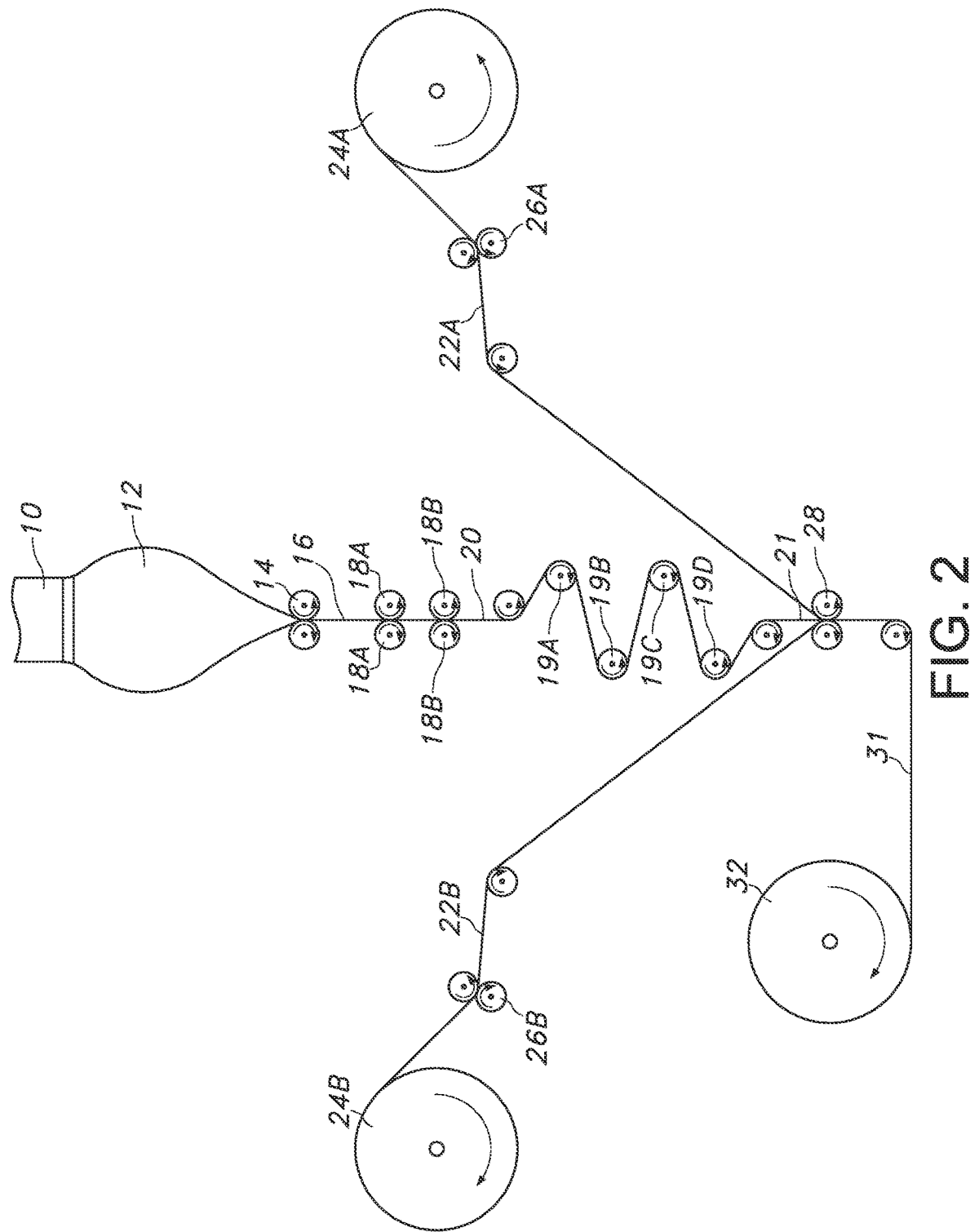
FIG. 2 is a schematic illustration of a method for forming a composite material according to an alternative embodiment of the present invention.

In an alternate embodiment, and in reference to FIG. 2, the extrudate is similarly extruded, blown and stretched. In this regard, like numerals have been used to denote like components and/or function. However, unlike the process described in relation to FIG. 1, the stretched film 20 is maintained under tension along an S-wrap assembly 19 prior to lamination to a facing material or fabric. In certain embodiments the stretched film 20 is then maintained in the stretched state for at least about 0.5 seconds, 0.6 seconds, or 0.8 seconds or more. The sustained state in the stretched condition helps increase and/or set the latent properties within the film. The conditioned, stretched film 21 is thereafter laminated to at least one support material or fabric 22A, and optionally also to a second support material or fabric 22B, in order to form a multilayer laminate or composite material 31. The composite material 31 is thereafter wound on a winding roll under tension, however the tension may be less than that associated with the prior embodiment. In this regard, the composite material may be allowed to substantially retract prior to being wound onto the roll such as by employing a wind-up speed for the take-up roll 32 that is less than the speed of the composite material 31 immediately prior to the bonding rolls 28. The composite material may be allowed to retract up to about 80%, 75%, 70%, 65% or even 60% of its length; in other words the wind-up roll 32 may operate at a circumferential speed at least about 20%, 25%, 30%, 35% or even 40% of that of the upstream rolls such as the lamination rolls 28 as shown in this embodiment.

It will be readily appreciated that the above processes may be incorporated into still other methods of making elastic laminates. By way of example only, the process of the present invention can be incorporated into one or more of the methods and to form materials described in U.S. Pat. No. 7,803,244 Siqueira et al., the contents of which are incorporated herein by reference to the extent consistent herewith. For instance, the elastic film 20, 21 and the outer fabrics 22A, 22B may be directed to a nip defined between rolls 28 for attaching the layers and forming a cohesive multi-layer laminate. One or both of the rolls 28 may contain a plurality of raised bonding elements and/or be heated. Upon lamination, the elastic film 20, 21 is melt fused to the fibrous materials 22A, 22B at a plurality of discrete bond sites. That is, the elastomeric polymer(s) of the film 20, 21 are softened and/or melted so that they may physically entrap fibers of the fabrics 22A, 22B. Of course, the elastic film 20, 21 may possess a certain tack so that it also adheres to the fibers upon lamination. Depending on the heat and/or pressure employed by the patterned rolls, the bond sites may be located proximate corresponding apertures, which are formed by displacement of the film. As described in more detail in Siqueira, the particular location of the bond sites adjacent to or near the apertures may enhance the integrity of the resulting composite material by strengthening the area surrounding the apertures and also provide vapor permeability to the composite material.

In addition, while not shown here, various additional potential processing and/or finishing steps known in the art, such as slitting, treating, aperturing, printing graphics, etc., may be performed without departing from the spirit and scope of the invention. For instance, the resulting composite material may optionally be mechanically stretched in the cross-machine and/or machine directions to enhance extensibility. In one embodiment, the composite material may be directed through two or more rolls that have grooves in the CD and/or MD directions. Besides grooved rolls, other techniques may also be used to mechanically stretch the composite material in one or more directions. For example, the composite material may be passed through a tenter frame, machine direction orienter or other apparatus known in the art. The composite material may alternatively and/or additionally be necked as noted above. Examples of various stretching systems believed suitable for use with the present invention include, but are not limited to, those described in US414400 to Schwarz, U.S. Pat. No. 4,981,747 to Morman, U.S. Pat. No. 5,770,531 to Sudduth et al., U.S. Pat. No. 5,789,065 to Haffner et al., U.S. Pat. No. 6,368,444 Jameson et al., U.S. Pat. No. 7,198,742 to Gerndt, U.S. Pat. No. 7,320,948 Morman et al and US2006/151914 to Gerndt et al.

The composite material of the present invention may be more easily processed into an end product because it has less elasticity prior to activation, and thus is more dimensionally stable. For example, a latent elastic composite material may be incorporated into an absorbent personal care article or personal protective garments in order to provide an elastic region and/or component therein. During the manufacturing or assembly process, the latent elastic composite material may be attached to one or more other components of the article and then activated through the application of heat either specifically for the function of shrinking the film or in combination with other functional steps, such as during the curing process for an adhesive used to attach together various components of the product. Because the latent elastic composite material has a greater dimensional stability than highly elastic materials, enhanced processing efficiencies may be realized. For example, the composite material need not be maintained in a mechanically stretched condition during attachment to other components of the product. This allows for greater freedom in the location and manner in which the adhesive is applied. In addition, the shrinking of the film and shirring of the composite material together with one or more components of the article in which it is incorporated may yield an article with improved elasticity and/or freedom of movement.

One skilled in the art will appreciate that the application and use of the elastic composite materials of the present invention can be used in the manufacture and construction of absorbent personal care articles such as diapers, adult incontinence garments, incontinence pads/liners, sanitary napkins, panty-liners and so forth. In this regard, absorbent personal care articles commonly include a liquid-impervious outer cover, a liquid permeable topsheet positioned in facing relation to the outer cover, and an absorbent core between the outer cover and topsheet. Further, absorbent personal care articles also commonly include one or more fit related components such as fastening tapes or tabs, waistbands, elastic waist panels, elastic side panels, elasticated leg cuffs, flaps and so forth. The unique elastic composite materials made and provided herein are well suited for use as or as a component of absorbent personal care articles having one or more elasticated components. By way of example only, various elasticated personal care absorbent articles and methods of making the same include, but are not limited to, those described in U.S. Pat. No. 4,685,916 to Enloe, U.S. Pat. No. 4,816,094 Pomplum et al., U.S. Pat. No. 4,857,067 to Wood et al., U.S. Pat. No. 5,643,396 to Rajala et al., U.S. Pat. No. 5,745,922 to Rajala et al., U.S. Pat. No. 5,940,887 to Rajala et al., U.S. Pat. No. 6,336,922 to VanGompel et al., U.S. Pat. No. 6,953,452 to Popp et al., U.S. Pat. No. 7,018,369 to VanGompel et al., and U.S. Pat. No. 7,150,731 to Cazzato et al., the contents of which are incorporated herein by reference to the extent consistent herewith.

As previously noted, absorbent personal care articles generally include a liquid permeable topsheet, which faces the wearer, and a liquid-impermeable backsheet or outer cover. Disposed between the topsheet and outer cover is an absorbent core. In this regard, the topsheet and outer cover are often joined and/or sealed to encase the absorbent core. Although certain aspects of the present invention are described in the context of a particular personal care absorbent article, it will be readily appreciated that similar uses in other types of personal care absorbent articles and/or further combinations or alterations of the specific configurations discussed below may be made by one skilled in the art without departing from the spirit and scope of the present invention.

Figure 3:
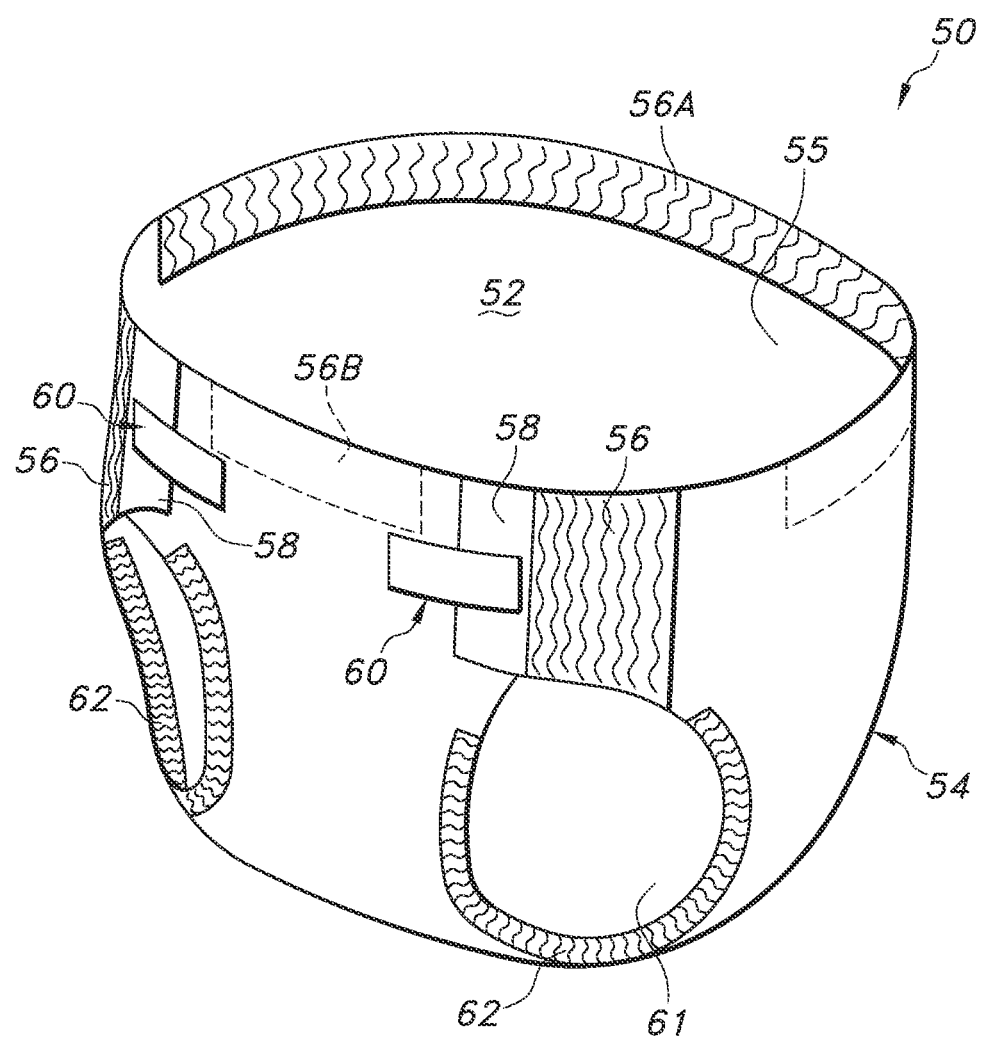
FIG. 3 is a perspective view of an absorbent personal care article incorporating elastic composite materials of the present invention.

In a particular embodiment, and in reference to FIG. 3, a diaper 50 can comprise a liquid-impervious outer cover 54, a liquid permeable topsheet 52 positioned in facing relation to the outer cover 54, and an absorbent core (not shown) between the outer cover 54 and topsheet 52. The diaper 50 may be of various shapes such as, for example, an overall rectangular shape, T-shape, hourglass shape and so forth. The topsheet is generally coextensive with the outer cover but may optionally cover an area that is larger or smaller than the area of the outer cover. While not shown, it is to be understood that portions of the diaper, such as a marginal section of the outer cover, may extend past and around the terminal edges of the product and form a portion of the body-facing layer.

The topsheet or body-side liner 52, as representatively illustrated in FIG. 3, desirably presents a body facing surface which is compliant, soft to the touch, and non-irritating to the wearer's skin. The topsheet 52 allows liquid to be quickly taken into the absorbent article and, desirably, to also help isolate the wearer's skin from liquids held in the absorbent core. Topsheets are well known in the art and may be manufactured from a wide variety of materials, such as porous foams, reticulated foams, apertured plastic films, natural fibers (wool, cotton fibers, etc.), synthetic fibers (polyester, polypropylene, polyethylene, etc.), combinations of natural and synthetic fibers, and so forth. Topsheets can comprise a single layer or multiple layers including a combination of one or more different materials. Nonwoven fabrics, and laminates thereof, are commonly utilized to form topsheets. Suitable topsheet materials include, but not limited to, those described in U.S. Pat. No. 5,382,400 to Pike et al., U.S. Pat. No. 5,415,640 to Kirby et al., U.S. Pat. No. 5,527,300 to Sauer, U.S. Pat. No. 5,994,615 to Dodge et al., U.S. Pat. No. 6,383,960 to Everett et al., U.S. Pat. No. 6,410,823 to Daley et al. and US2014/0121623 to Biggs et al.

The backsheet or outer cover 54 comprises a liquid-impervious material. Desirably, the outer cover comprises a material that prevents the passage of water but allows air and water-vapor to pass there through. The outer cover can comprise a single layer of material or multiple layers including one or more layers of different materials. In a particular embodiment, the outer cover can comprise a film fixedly attached or bonded to one or more nonwoven webs. The particular structure and composition of the outer cover may be selected from various combinations of films and/or fabrics. In this regard, the outer most layers are generally selected for providing the desired strength, abrasion resistance, tactile properties and/or aesthetics. As an example, nonwoven fabrics are commonly employed as the outermost layer of the outer cover. Suitable outer covers include, but are not limited to, those described in U.S. Pat. No. 4,041,203 to Brock et al., U.S. Pat. No. 6,075,179 et al. to McCormack et al., U.S. Pat. No. 6,111,163 to McCormack s et al. and US2015/099086 to Cho et al.

In the present embodiment, the diaper 50 may also include an elastic waistband 56 located about the waist opening 55. The elastic composite material providing the elasticity for the waistband can be located either exposed on the skin-contacting side of the topsheet, exposed on the outside of the backsheet and/or positioned between the topsheet and backsheet. When positioned on the skin-contacting surface of the topsheet, the waistband can also provide a dual function of acting as a containment pocket as is known in the art.

Further, as shown in FIG. 3, in certain embodiments the diaper may be provided with separate front and rear waistbands respectively 56A, 56B. Alternatively, for certain pant style garments, a continuous elastic waistband may be employed.

The diaper 50 may, in certain embodiments, further include elastic side panels 56. The elastic composite material providing the elasticity to the side panels can form all or a portion of each side panel. For example, optionally, an inelastic panel 58 may be positioned between the fastener 60 and the elastic composite material forming a portion of the side panel 56. As is known in the art, the elastic side panels may be integrally formed with the backsheet and/or topsheet or, alternatively, comprise a separate component that is attached to the central diaper chassis such as being attached to at least one or both of the backsheet and topsheet. The diaper 50 may further include elastic leg cuffs 62 located about the leg openings 61. The leg cuffs may be curved about the leg opening or multiple leg elastics may be used extending proximate the leg openings towards the side panels and front and rear waist openings. Still further, one skilled in the art will appreciate that the elastic composite material of the present invention may be used in one or more components different and/or additional components of the articles described herein to provided elasticity and stretch properties thereto.

In addition, one skilled in the art will appreciate that the elastic composite materials may similarly be used to provide elasticity and fit enhancing attributes to other garments or articles including for example protection garments. In this regards, the elastic composite material can be employed to form elastic panels, waistbands, cuffs and so forth. By way of example only, the elastic composite material may be employed in the garments as described in U.S. Pat. No. 5,594,955 Sommers, U.S. Pat. No. 6,799,331 Griesbach et al., and US2005/097659 to Aroch et al., the contents of which are incorporated herein by reference to the extent consistent herewith. In a similar manner, the elastic composite material may be employed in another articles such as for example, wipes, sweat pads, washcloths, bandages, body-wraps, bed pads and so forth.

Test Methods

Percent Stretch: Percent stretch is determined by measuring the increase in length of the material in the stretched dimension, dividing that value by the original dimension of the material, and then multiplying by 100. Such measurements are determined using the "strip elongation test", which is substantially in accordance with the specifications of ASTM D5035-11. Specifically, the test uses two clamps, each having two jaws with each jaw having a facing in contact with the sample. The clamps hold the material in the same plane, usually vertically, separated by 3 inches and move apart at a specified rate of extension. The sample size is 3 inches by 6 inches, with a jaw facing height of 1 inch and width of 3 inches, and a constant rate of extension of 300 mm/min. The specimen is clamped in, for example, a Sintech 2/S tester with a Renew MTS mongoose box (control) and using TESTWORKS 4.07b software (Sintech Corp, of Cary, N.C.). The test is conducted under ambient conditions. Results are generally reported as an average of three specimens and may be performed with the specimen in the cross direction (CD) and/or the machine direction (MD).

Percent Heat Shrinkage: A strip of material under tension on the roll is removed from the roll and allowed to retract. A 75 mm×175 mm strip is then cut from the material and marks are placed 100 mm apart, the distance between the marks is the initial length (Before Heated Retraction Length or "BHRL"). The material is then submerged in 72° C. water for 2 minutes. The strip of material is then allowed to cool to room temperature. Thereafter, the distance between the marks is again measured (After Heated Retraction Length or "AHRL"). The percent shrinkage is indicative of the latent elasticity of the material and is calculated by the following equation:

percent shrinkage=100*(BHRL−AHRL)/BHRL

Measurements are obtained on 3 samples and averaged. The measurements are taken at ambient conditions.

Tensile Strength: As used herein "tensile strength" or "strip tensile", is the peak load value, i.e. the maximum force produced by a specimen, when it is pulled to rupture. Samples for tensile strength testing are prepared by drying and then die cutting test specimens to a width of 25 mm and length of approximately 152 mm. The instrument used for measuring tensile strengths is an MTS Criterian 42 and MTS TestWorks™ for Windows Ver. 4 (MTS Systems Corp., Research Triangle Park, N.C.). The load cell is selected, depending on the strength of the sample being tested, such that the peak load values fall between 10 and 90 percent of the load cell's full scale load. The gauge length is 76 mm and jaw length is 76 mm. The crosshead speed is 305 mm/minute, and the break sensitivity is set at 70% and the slope preset points at 70 and 157 g. The sample is placed in the jaws of the instrument and centered with the longer dimension parallel to the direction of the load application. The test is then started and ends when the specimen breaks. The peak load is determined, for purposes herein, based upon the CD tensile strength. Six (6) representative specimens are tested, and the arithmetic average of all individual specimen tested is the tensile strength for the product.

EXAMPLES

Example 1

A mixture of 70% INFUSE 9108, 20.5% INFUSE 9508, 9% Vistamaxx and 0.5% antioxidants was melted and extruded to form a film by the cast film process. The film extrudate was passed over chill rolls at 18° C. and then fed to a first s-wrap assembly. The speed of the upstream roll was 0.25 M/second (50 fpm) and the speed of the downstream roll was 1.52 M/second (300 fpm) thereby stretching the film. The film was then directed to a second s-wrap assembly operating at a speed of 1.46 M/second (289 fpm). From the second s-wrap assembly the stretched film was directed to a calender roll operating at 1.39 M/second (273 fpm). The stretched film was passed through the calender roll together with two polypropylene spunbond nonwoven webs, each having a basis weight of 12 g/M² and adjacent opposite sides of the film. The nonwoven webs and film were laminated in the calender rolls using the Rib-Knit bond pattern, as shown in FIG. 12 of U.S. Pat. No. 5,620,779 Levy et al., having a bond area of about 15%. The film/nonwoven laminate was then wound onto a winding roll operating at a speed of 0.47 M/second (92 fpm). The wound laminate was maintained on the roll for over 3 days. The laminate had a high retractive force and a percent heat shrinkage of 26%.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The invention claimed is:

1. A method of making an elasticated article comprising:
melt extruding an extrudate having a polymeric portion comprising greater than 90% (by wt.) semi-crystalline olefin polymer;
chilling said extrudate to form a film having a temperature between about 10° C. and about 50° C.;
stretching said film between 2 times and 7 times its original length;
bonding a support fabric to said film at intermittent points while the film is in a stretched condition to form a composite material;
winding said composite material onto a winder roll under tension such that said composite material retracts less than 80% of its length at the time of said bonding step;
aging said tensioned composite material on said roll for at least 24 hours thereby forming a heat shrinkable composite material;
attaching the heat shrinkable composite material to at least one component of an article at two locations distal to one another and thereby forming distal points of attachment;
applying heat to said heat shrinkable composite material wherein the composite material shrinks and acts to pull inwardly between said distal points of attachment and cause the distal points of attachment to move closer to one another and create an elasticized region within said article; and
wherein said article comprises an absorbent personal care article having a liquid permeable body-facing topsheet, a liquid impermeable backsheet and an absorbent core between said topsheet and backsheet, said heat shrinkable composite material is attached to at least one of said topsheet and backsheet, and the polymeric portion of the extrudate comprises at least 95% by wt. semi-crystalline polyolefin polymer selected from the group consisting of ethylene semi-crystalline polymers having a density between about 0.85 g/cm³ and 0.89 g/cm³ and a propylene semi-crystalline polymers having a density between about 0.85 g/cm³ and 0.89 g/cm³.

2. The method of claim 1 wherein said extrudate comprises greater than 50% by weight propylene polymer and further wherein said at a temperature of said film at the onset of stretching is between about 21° C. and about 10° C.

3. The method of claim 1 wherein said extrudate comprises greater than 50% by weight ethylene polymer and further wherein said at a temperature of said film at the onset of stretching is between about 32° C. and about 10° C.

4. The method of claim 1 wherein said stretched film is bonded to a support fabric comprising a nonwoven fabric and having a basis weight between about 5 g/M² and about 20 g/M² and a tensile strength of at least about 50 grams-force.

5. The method of claim 1 wherein the polymeric portion of the extrudate comprises at least about 95% (by wt.) of a semi-crystalline olefin polymer having a crystallinity between about 3 and about 30%.

6. The method of claim 1 wherein the heat shrinkable film shrinks between about 15% and about 50% upon applying heat to shrink the composite material and pull inwardly between said distal points of attachment.

* * * * *